US012657532B2

(12) United States Patent
Wang et al.

(10) Patent No.: US 12,657,532 B2
(45) Date of Patent: Jun. 16, 2026

(54) TICKET EMBEDDING BASED ON MULTI-DIMENSIONAL IT DATA

(71) Applicant: International Business Machines Corporation, Armonk, NY (US)

(72) Inventors: Zhi Wang, ShangHai (CN); Zhao Qi Wu, Shanghai (CN); Li Na Yuan, Beijing (CN); Qian Ke Fang, Ningbo (CN); Li Long Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1130 days.

(21) Appl. No.: 17/548,768

(22) Filed: Dec. 13, 2021

(65) Prior Publication Data

US 2023/0186190 A1     Jun. 15, 2023

(51) Int. Cl.
*G06Q 10/0631* (2023.01)
*G06N 3/04* (2023.01)
*G06N 3/08* (2023.01)

(52) U.S. Cl.
CPC ......... *G06Q 10/06311* (2013.01); *G06N 3/04* (2013.01); *G06N 3/08* (2013.01)

(58) Field of Classification Search
None
See application file for complete search history.

(56) References Cited

U.S. PATENT DOCUMENTS

| | | | | |
|---|---|---|---|---|
| 9,171,102 B1 * | 10/2015 | Zlatnik | ............... | G06F 16/9024 |
| 10,740,692 B2 * | 8/2020 | Mann | ...................... | G06F 11/30 |
| 11,803,402 B1 * | 10/2023 | Gupta | ................... | G06F 3/0484 |
| 11,954,609 B2 * | 4/2024 | Nagarajan | .............. | G06Q 10/20 |
| 2007/0058564 A1 * | 3/2007 | Agrawala | ............. | H04J 3/0661 370/252 |
| 2007/0076601 A1 * | 4/2007 | Wang | ................... | H04L 45/123 370/229 |
| 2014/0207385 A1 * | 7/2014 | Martin | .................. | G16B 99/00 702/19 |

(Continued)

FOREIGN PATENT DOCUMENTS

| | | | | |
|---|---|---|---|---|
| CA | 3042926 A1 * | 11/2019 | ......... | G06F 16/3329 |
| CN | 110134881 A * | 8/2019 | | |

(Continued)

OTHER PUBLICATIONS

Vaswani, A., Shazeer, N., Parmar, N., Uszkoreit, J., Jones, L., Gomez, A. N., . . . & Polosukhin, I. (2017). Attention is all you need. Advances in neural information processing systems, 30. (Year: 2017).*

(Continued)

*Primary Examiner* — Ryan Barrett
(74) *Attorney, Agent, or Firm* — Teddi E. Maranzano

(57) ABSTRACT

An approach is provided that trains an artificial intelligence (AI) system, such as a neural network, to process IT ticket data. The approach receives IT tickets from various ticket sources. Ticket vectors corresponding to each of the IT tickets are computed. An analysis is performed using the ticket vectors and a node vector that corresponds to a network topology. The analysis is performed using a corpus of IT ticket data. An IT ticket model used by the AI system is trained based on the analysis. Responses are provided to requestors of the AI system using the trained IT ticket model.

20 Claims, 8 Drawing Sheets

(56)                References Cited

U.S. PATENT DOCUMENTS

| | | | |
|---|---|---|---|
| 2019/0318204 A1* | 10/2019 | Mishra | G06Q 10/06316 |
| 2019/0347282 A1 | 11/2019 | Cai | |
| 2020/0104752 A1* | 4/2020 | Meng | G06N 3/088 |
| 2020/0293946 A1* | 9/2020 | Sachan | G06N 5/04 |
| 2021/0097551 A1 | 4/2021 | Tzur | |
| 2024/0135323 A1* | 4/2024 | Kumar | G06Q 10/20 |
| 2025/0036925 A1* | 1/2025 | Liu | G06N 3/048 |
| 2025/0317370 A1* | 10/2025 | Dave | G06N 20/00 |

FOREIGN PATENT DOCUMENTS

| | | | | |
|---|---|---|---|---|
| CN | 110516611 A | * | 11/2019 | G16H 50/20 |
| WO | WO-2023113878 A1 | * | 6/2023 | G06N 3/08 |

OTHER PUBLICATIONS

Veličković, P., Cucurull, G., Casanova, A., Romero, A., Lio, P., & Bengio, Y. (2017). Graph attention networks. arXiv preprint arXiv: 1710.10903. (Year: 2017).*

Cristian, M., Christian, S., & Dumitru-Tudor, T. (Sep. 2019). A study in the automation of service ticket recognition using natural language processing. In 2019 International Conference on Software, Telecommunications and Computer Networks (SoftCOM) (pp. 1-6). IEEE. (Year: 2019).*

Chen, Z., Liu, J., Su, Y., Zhang, H., Wen, X., Ling, X., . . . & Lyu, M. R. (Nov. 2021). Graph-based incident aggregation for large-scale online service systems. In 2021 36th IEEE/ACM International Conference on Automated Software Engineering (ASE) ( pp. 430-442). IEEE. (Year: 2021).*

Anonymous, "A Cognitive Method to Assist in Generating a Better Response in a Support System," IP.com No. IPCOM000264315D, Dec. 2, 2020, 5 pages.

Han et al., "DeepRouting: A Deep Neural Network Approach for Ticket Routing in Expert Network," 2020 IEEE International Conference on Services Computing, Beijing, China, Nov. 2020, 8 pages.

Mikolov et al., "Distributed Representations of Words and Phrases and their Compositionality," Cornell University, Ithaca, NY, Oct. 2013, 9 pages.

Wahba et al., "Evaluating the Effectiveness of Static Word Embeddings on the Classification of IT Support Tickets," CASCON '20: Proceedings of the 30th Annual International Conference on Computer Science and Software Engineering, Toronto, ON, Canada, Nov. 2020, 10 pages.

Bansal et al., "IT Ticket Classification," Analytics Insight, Aug. 22, 2020, 15 pages.

Gupta et al., "Multi-dimensional Knowledge Integration for Efficient Incident Management in a Services Cloud," 2009 IEEE International Conference on Services Computing, Bangalore, India, Sep. 2009, pp. 57-64.

Grover et al., "node2vec: Scalable Feature Learning for Networks," Cornell University, Ithaca, NY, Jul. 2016, 10 pages.

* cited by examiner

Information Handling System
Processor and Components

200

TICKET EMBEDDING BASED ON MULTI-DIMENSIONAL IT DATA

BACKGROUND

An issue tracking system manages and maintains lists of issues regarding an organization, institution, or the Ike. Such systems can be used to create, update, and resolve customer issues or issues noted by employees or by users of a computer system. A ticket element, within an issue tracking system, is a running report on a particular problem, its status, and other relevant data. They are commonly created in a help desk or call center environment and almost always have a unique reference number, also known as a case, issue or call log number which is used to allow the user or help staff to quickly locate, add to or communicate the status of the user's issue or request. Issues can have several aspects to them. Each issue in the system may have an urgency value assigned to it, based on the overall importance of that issue. Low or zero urgency issues are minor and should be resolved as time permits. Other details of issues include the customer experiencing the issue (whether external or internal), date of submission, detailed descriptions of the problem being experienced, attempted solutions or workarounds, and other relevant information. Each issue maintains a history of each change.

SUMMARY

An approach is provided that trains an artificial intelligence (AI) system, such as a neural network, to process IT ticket data. The approach receives IT tickets from various ticket sources. Ticket vectors corresponding to each of the IT tickets are computed. An analysis is performed using the ticket vectors and a node vector that corresponds to a network topology. The analysis is performed using a corpus of IT ticket data. An IT ticket model used by the AI system is trained based on the analysis. Responses are provided to requestors of the AI system using the trained IT ticket model.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
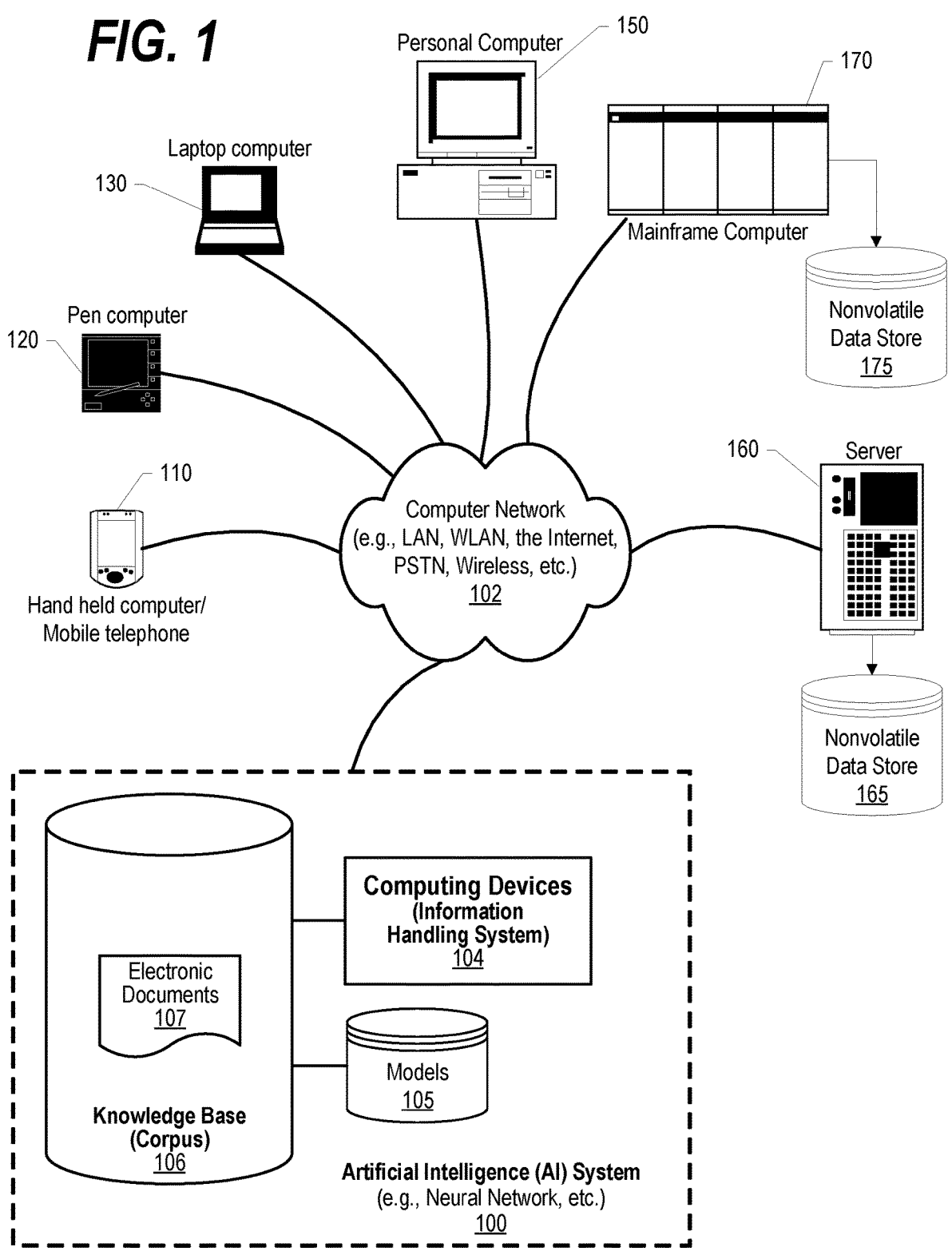
FIG. 1 depicts a network environment that includes a knowledge manager that utilizes a knowledge base.

FIGS. 1-8 describe an approach to address and manage issue tracking (IT) ticket data using various computed vectors. Efficient service delivery is critical for Operation in the currently competitive business environment. However, the increasing complexity and scalability of IT service make the delivery and support more and more difficult. With the help of Artificial Intelligence for IT Operations (AIOps), it is possible to identify cost-effective approaches for various problems in the field. The approach described herein uses AIOps to perform IT ticket analysis.

In ticket analysis, ticket embedding is an effective and widely used tool. Embedding is a relatively low-dimensional space that contains information from corresponding high-dimensional vectors. Embedding become rather complicated when it comes to the fields of AIOps. This is because tickets information is quite discrete. Existing ticket embedding methods are limited to a single data source like ticket description, and this makes the embedding results difficult to meet expectations. Consequently, the approach described herein applies a more intelligent ticket embedding method. This new method collects valid information related to tickets and compresses them into vectors that are then interpreted. The vectorized tickets enhance many tasks with respect to ticket analysis, such as the solution recommendation task.

The approach compares vectors of new tickets with those from historical tickets to identify similarities and recommend resolutions from historical tickets as potential solutions for the new tickets. The approach provides new and unique methods focuses on the unique features of this field, integrates richer information and has better performance.

This approach presents novel and unique ways to perform AIOps ticket embedding, wherein multi-dimensional knowledge is extracted and converged into ticket embedding that includes graph topology, time factors, human activities, and the like. The training process is optimized with a self-attention mechanism, and further uses a hybrid of unsupervised and supervised embedding for various scenarios. In this manner, the AIOps ticket embedding disclosed by this approach is enhanced for downstream Natural Language Processing (NLP) tasks, such as a user addressing issues using a question-answering (QA) system.

A method to transfer tickets and related side information into computable vectors is disclosed. An embedding method is provided to improve IT tickets identification by combining tickets summary, topology structure and other related side information for each IT ticket. A training model automatically merges different aspects of information with a self-attention mechanism. A ticket embedding system is provided that is suitable for multiple business scenarios. One model, an unsupervised model (model1), is used for most business scenarios. Another model, a supervised model (model2), is used when the ticket description does not provide enough information A graph embedding method that encodes ticket generation patterns from both single node and adjacent nodes in topology structure is further provided. Advantages of the approach described herein include the combination of data from the IT ticket itself and other information such as node topology information and side information. The approach seamlessly adds topology data to IT tickets. The approach reveals hidden information of IT tickets from multiple dimensions. The use of Self attention achieves the effect of parallel computing. Even when additional "side information" is introduced for an IT ticket, internal dependencies are captured.

Furthermore, this approach enhances the performance of downstream NLP tasks. Enhancements are derived because the approach improves the accuracy of similar ticket recommendations. The approach improves the root cause analysis using captured topology data and further improves the analysis of newly added tickets through other side information that is also captured.

FIG. 1 depicts a schematic diagram of one illustrative embodiment of artificial intelligence (AI) system 100 in a computer network 102. AI system 100 includes artificial intelligence computing device 104 (comprising one or more processors and one or more memories, and potentially any other computing device elements generally known in the art including buses, storage devices, communication interfaces, and the like) that connects AI system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. AI system 100 and network 102 may enable functionality, such as question/answer (QA) generation functionality, for one or more content users. Other embodiments of AI system 100 may be used with components, systems, sub-systems, and/or devices other than those that are depicted herein.

AI system 100 maintains knowledge base 106, also known as a "corpus," which is a store of information or data that the AI system draws on to solve problems. This knowledge base includes underlying sets of facts, assumptions, models, and rules which the AI system has available in order to solve problems.

AI system 100 may be configured to receive inputs from various sources. For example, AI system 100 may receive input from the network 102, a corpus of electronic documents 107 or other data, a content creator, content users, and other possible sources of input. In one embodiment, some or all of the inputs to AI system 100 may be routed through the network 102. The various computing devices on the network 102 may include access points for content creators and content users. Some of the computing devices may include devices for a database storing the corpus of data. The network 102 may include local network connections and remote connections in various embodiments, such that artificial intelligence 100 may operate in environments of any size, including local and global, e.g., the Internet. Additionally, artificial intelligence 100 serves as a front-end system that can make available a variety of knowledge extracted from or represented in documents, network-accessible sources and/or structured data sources. In this manner, some processes populate the artificial intelligence with the artificial intelligence also including input interfaces to receive knowledge requests and respond accordingly.

In one embodiment, the content creator creates content in electronic documents 107 for use as part of a corpus of data with AI system 100. Electronic documents 107 may include any file, text, article, or source of data for use in AI system 100. Content users may access AI system 100 via a network connection or an Internet connection to the network 102, and, in one embodiment, may input questions to AI system 100 that may be answered by the content in the corpus of data. As further described below, when a process evaluates a given section of a document for semantic content, the process can use a variety of conventions to query it from the artificial intelligence.

Types of information handling systems that can utilize AI system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
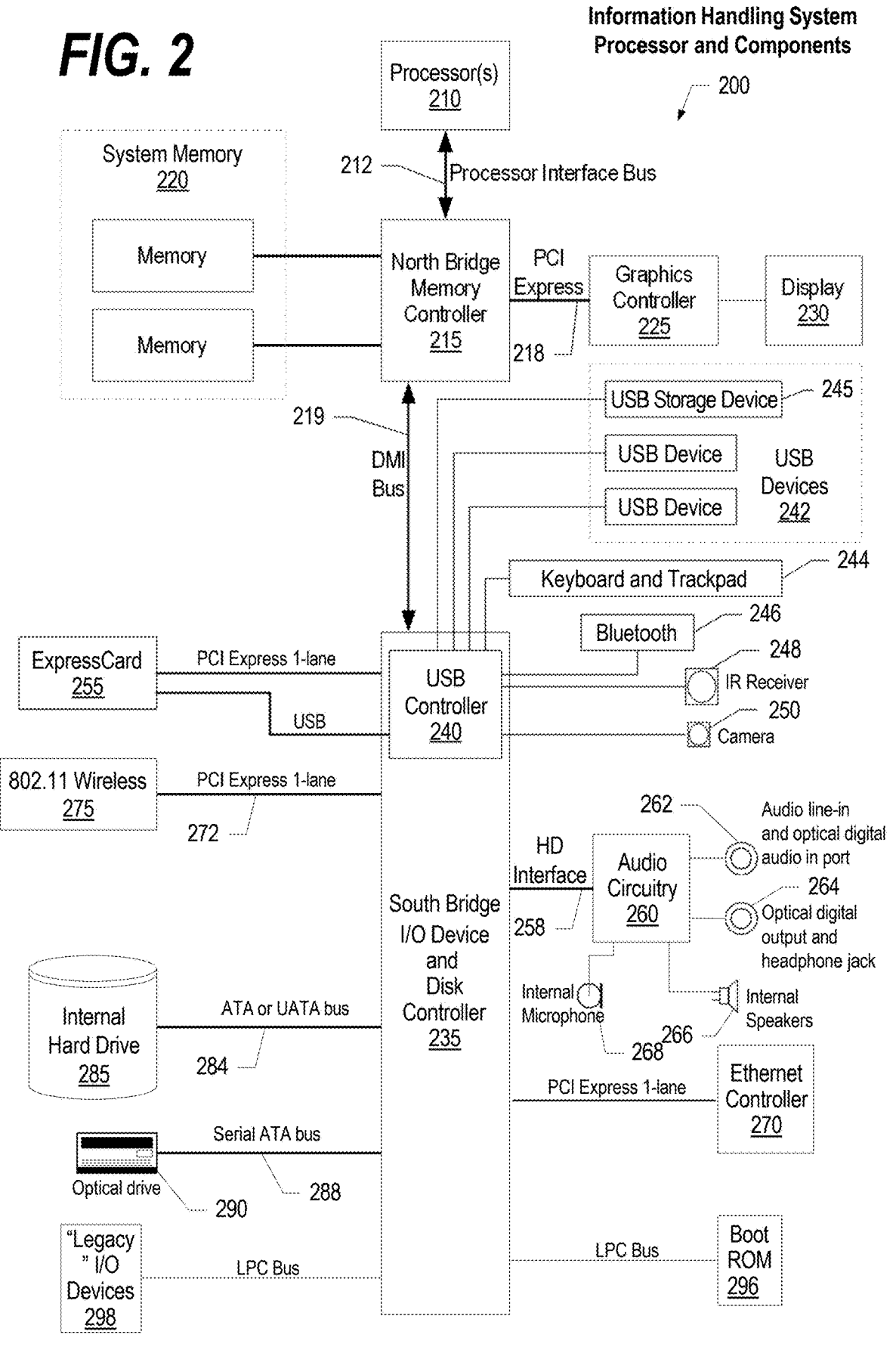
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM). Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
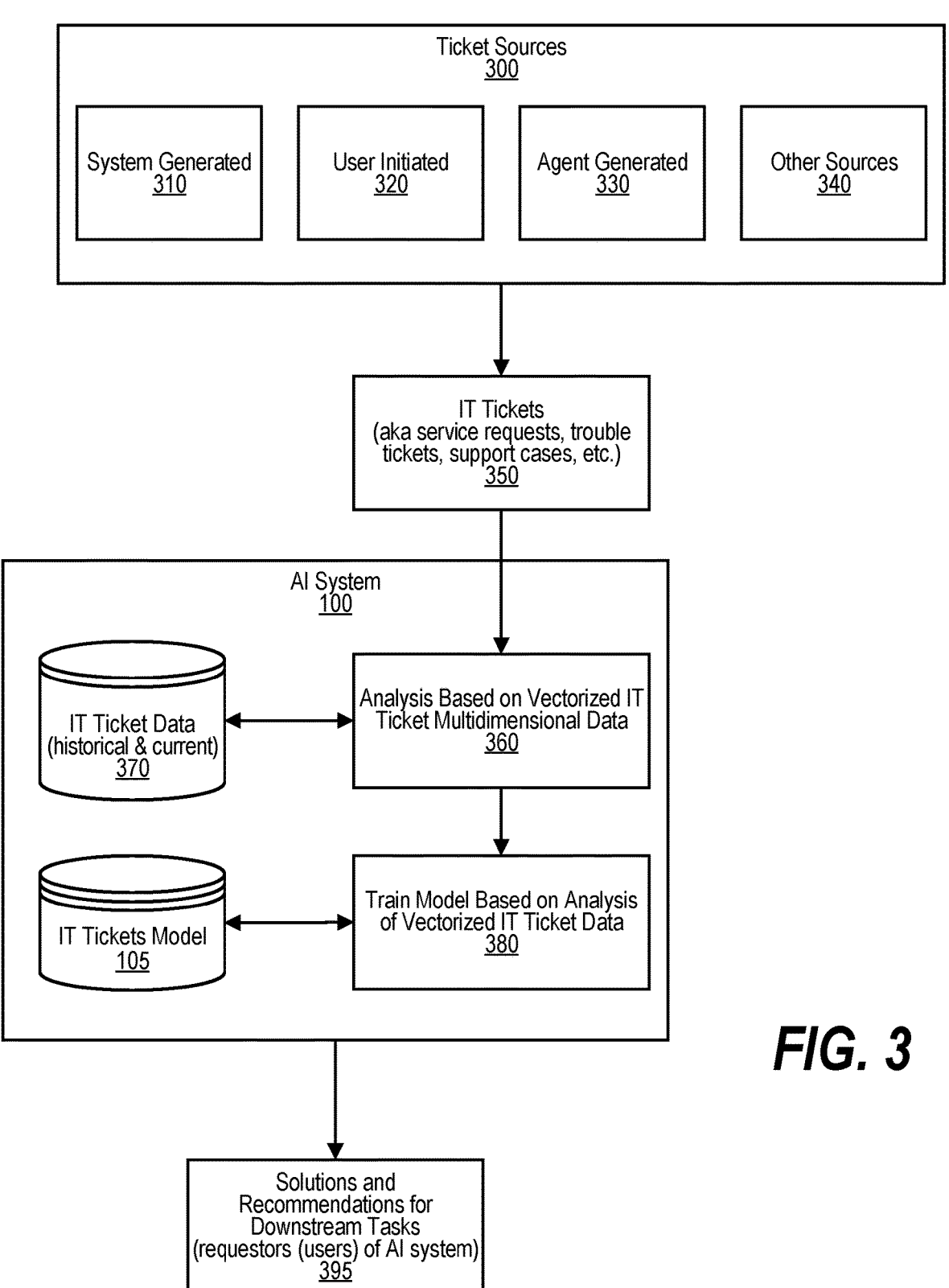
FIG. 3 is a component diagram showing various components used in a system that performs IT ticket analysis using computable vectors.

FIG. 3 is a component diagram showing various components used in a system that performs IT ticket analysis using computable vectors. Ticket sources 300 depicts any number of sources of IT tickets being input to the system. These ticket sources can include system generated sources 310 (e.g., automated error reporting, etc.), user-initiated ticket sources 320 (e.g., employees, customers, etc.), agent generated sources 330 (e.g., customer service reports, help desk reports, etc.), and other IT ticket sources 340.

Ticket sources 300 provide IT tickets 350. Depending on the implementation and environment, IT tickets 350 can correspond to many different issues being tracked by the issue tracking (IT) system. IT tickets can be service requests, trouble reports, support cases, and the like.

Artificial intelligence (AI) system 100 is trained to manage and analyze the various IT tickets input to the system. At 360, the system performs an analysis of the input IT tickets based on vectorized IT ticket multidimensional data against historical and current IT ticket data retained in data store 370.

At 380, the system trains the AI model 105 that is utilized by the AI system to analyze the input IT tickets using artificial intelligence (e.g., a neural network, etc.). At 395, the trained AI system is utilized by requestors (e.g., human users of the AI system, automated processes utilizing the AI system, etc.) to provide solutions and recommendations. These "downstream tasks" utilize the trained AI system, with training depicted in FIGS. 5-8, to identify previously learned data (ticket data, node topography data, and ticket "side information" data) to identify possible recommendations and solutions to apply to current IT tickets.

Figure 4:
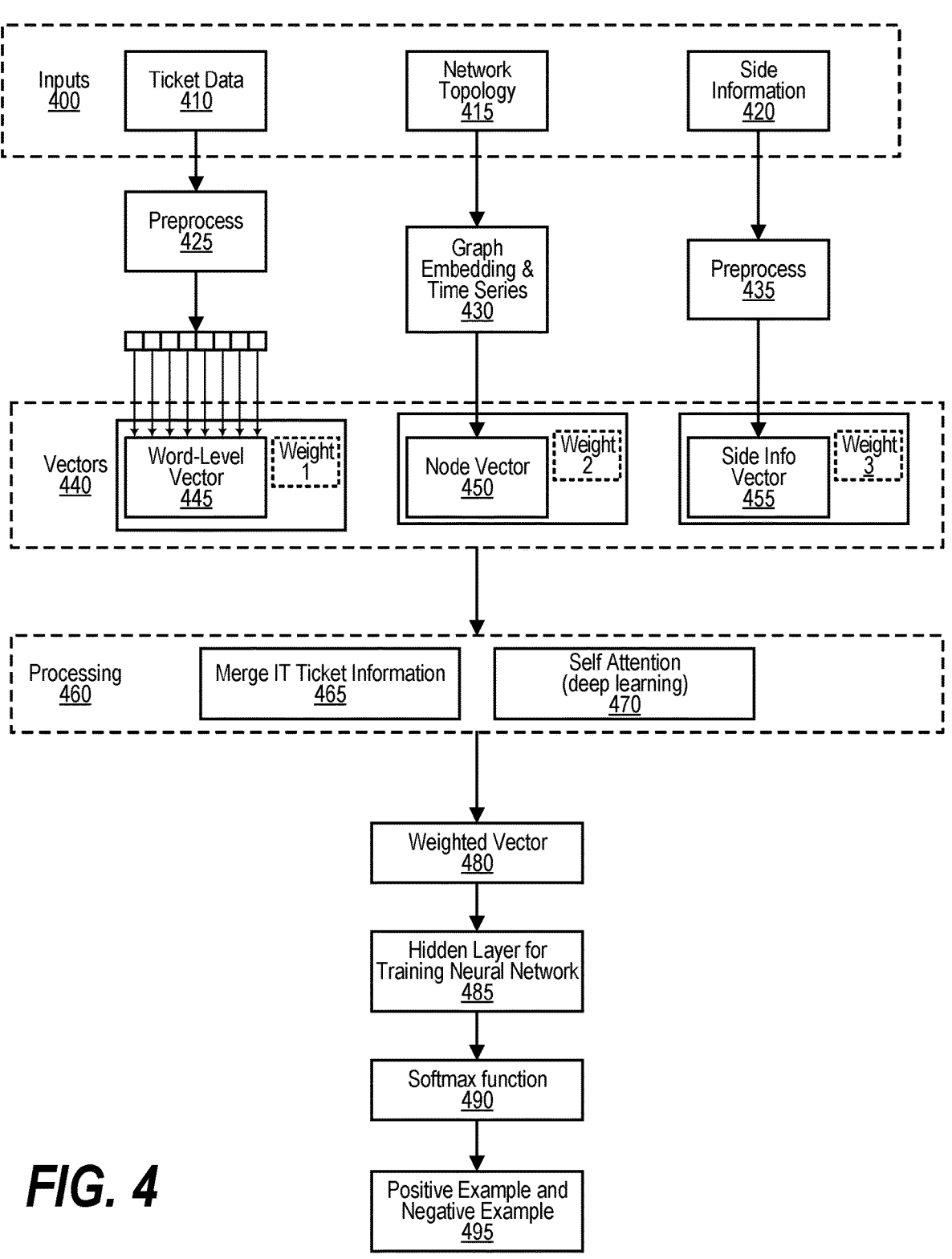
FIG. 4 is a diagram showing inputs being processed to vectors which are processed to weighted vectors to train a neural network using an unsupervised model.

FIG. 4 is a diagram showing inputs being processed to vectors which are processed to weighted vectors to train a neural network using an unsupervised model. Inputs 400 are processed into vectors as shown. IT Ticket data 410 includes descriptive data of the issue being tracked (e.g., problem being experienced by a customer, etc.). At step 425, the IT ticket data is preprocessed to generate word-level vector 445.

Network topology data is data regarding each node in a network topology. At step 430, graph embedding and time series processing is performed. Embeddings of each node in network topology 415 are determined based on a graph embedding method and a set of time series information. See FIG. 8, and corresponding text, for details regarding node topology processing. The graph embedding and time series process generates node vector 450.

Side information data 420 is data that is related to an IT ticket (e.g., metadata, etc.) and includes such data as comments data, location data, and customer data. At step 435, side information data 420 is preprocessed to generate side information vector 455.

Vectors 440 include vectors corresponding to the IT ticket data, the network topology, and the side information. IT ticket data 410 results in word-level vector 445, network topology 415 results in node vector 450, and side information data 420 results in side information vector 455. In one embodiment, each of the vectors can have a weight that is applied to the respective vector, shown as weights 1, 2, and 3 corresponding to the word-level vector, the node vector, and the side information vector, respectively.

Vector processing 460 includes both process 465 to merge IT ticket information vectors as well as process 470 which is a self-attention (deep learning) process. Self-attention is a technique that mimics cognitive attention. The effect enhances the important parts of the input data and fades out the rest—the thought being that the network should devote more computing power to that small but important part of the data. Which part of the data is more important than others depends on the context and is learned through training data by gradient descent. Merge processing (step 465) merges the various vectors. See FIGS. 6 and 7, and corresponding text, for additional details regarding the merge processing.

A result of processing 460 is weighted vector 480 that is used as an input layer to hidden layer 485 of the neural network that is, in one embodiment, included in AI system 100. Hidden layer 485 a layer in between input layers and output layers, where artificial neurons take in a set of weighted inputs and produce an output through an activation function.

Softmax function 490, or normalized exponential function, is a generalization of the logistic function to multiple dimensions. It is used in multinomial logistic regression and is used as the last activation function of the neural network to normalize the output of a neural network to a probability distribution over predicted output classes, based on Luce's choice axiom. Resulting positive example/negative example 495 is used to train the AI model.

Figure 5:
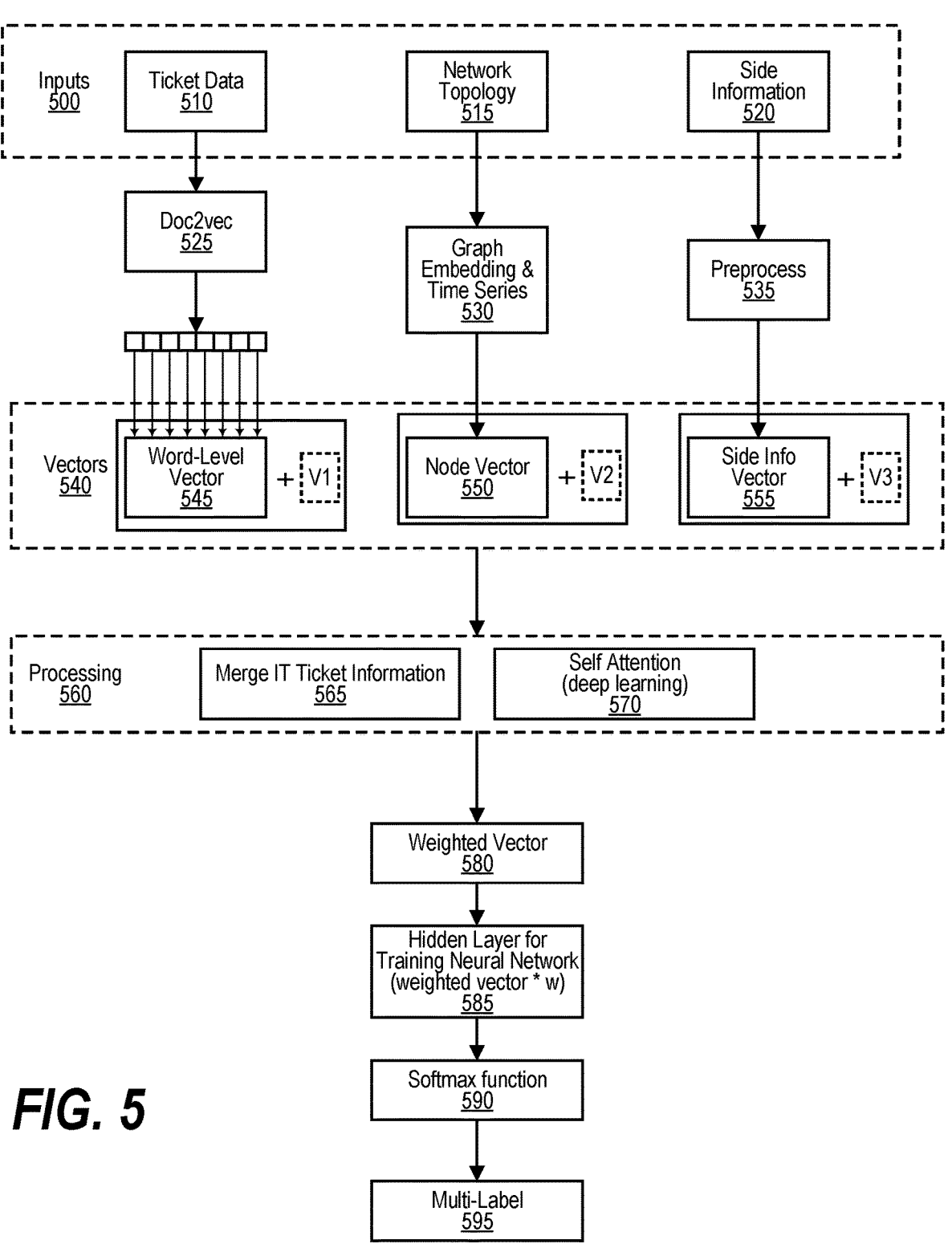
FIG. 5 is a diagram showing inputs being processed to vectors which are processed to weighted vectors to train a neural network using a supervised model when ticket data lacks necessary information.

FIG. 5 is a diagram showing inputs being processed to vectors which are processed to weighted vectors to train a neural network using a supervised model when ticket data lacks necessary information. Inputs 500 are processed into vectors as shown. IT Ticket data 510 includes descriptive data of the issue being tracked (e.g., problem being experienced by a customer, etc.). At step 525, the IT ticket data is preprocessed using Doc2Vec to embed the description of IT tickets based on the doc2vec method which generates word-level vector 545.

Network topology data is data regarding each node in a network topology. At step 530, graph embedding and time series processing is performed. Embeddings of each node in network topology 515 are determined based on a graph embedding method and a set of time series information. See FIG. 8, and corresponding text, for details regarding node topology processing. The graph embedding and time series process generates node vector 550.

Side information data 520 is data that is related to an IT ticket (e.g., metadata, etc.) and includes such data as comments data, location data, and customer data. At step 535, side information data 520 is preprocessed to generate side information vector 555.

Vectors 540 include vectors corresponding to the IT ticket data, the network topology, and the side information. IT ticket data 510 results in word-level vector 545, network topology 515 results in node vector 550, and side information data 520 results in side information vector 555. In one embodiment, each of the vectors is associated with sparse features, represented as sparse vectors V1, V2, and V3 which correspond to word-level vector 545, node vector 550, and side information vector 555, respectively. Sparse vectors V1, V2, and V3 are sparse features that tend to be one-hot-encoder vectors for tickets, network topology and different side information.

Vector processing 560 includes both process 565 to merge IT ticket information vectors as well as process 570 which is a self-attention (deep learning) process. Self-attention is a technique that mimics cognitive attention. The effect enhances the important parts of the input data and fades out the rest—the thought being that the network should devote more computing power to that small but important part of the data. Which part of the data is more important than others depends on the context and is learned through training data by gradient descent. Merge processing (step 565) merges the various vectors. See FIGS. 6 and 7, and corresponding text, for additional details regarding the merge processing.

A result of processing 560 is weighted vector 580 that is used as an input layer to hidden layer 585 of the neural network that is, in one embodiment, included in AI system 100. Hidden layer 585 a layer in between input layers and output layers, where artificial neurons take in a set of weighted inputs and produce an output through an activation function.

Softmax function 590, or normalized exponential function, is a generalization of the logistic function to multiple dimensions. It is used in multinomial logistic regression and is used as the last activation function of the neural network to normalize the output of a neural network to a probability distribution over predicted output classes, based on Luce's choice axiom. Resulting multi-label 595 is used to train the AI model. Multi-label classification involves predicting zero or more class labels. Multi-label classification is a predictive modeling task that involves predicting zero or more mutually non-exclusive class labels. The neural network models is configured for multi-label classification tasks.

Figure 6:
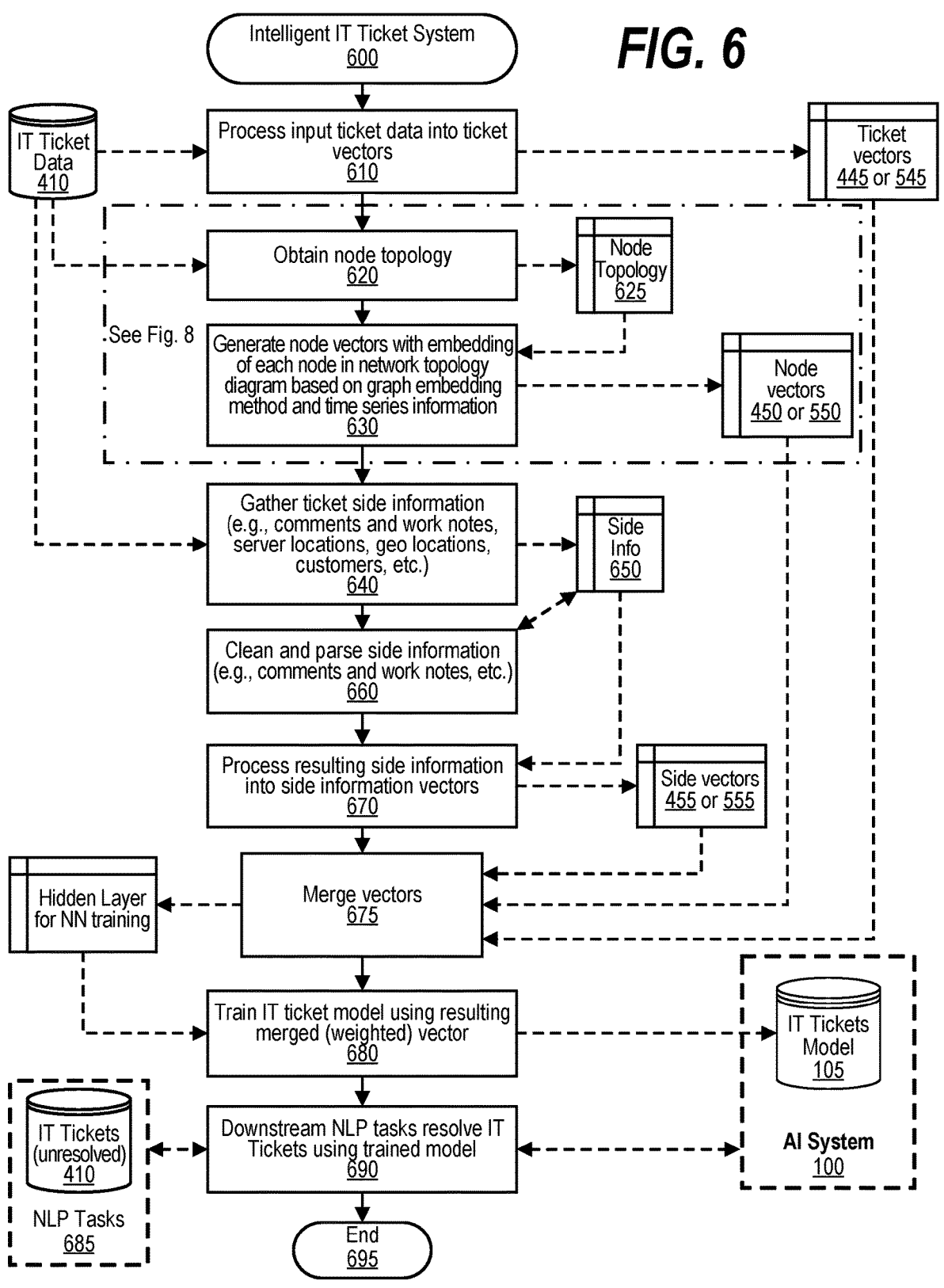
FIG. 6 is a depiction of a flowchart showing the logic used in an intelligent IT ticket system.

FIG. 6 is a depiction of a flowchart showing the logic used in an intelligent IT ticket system. FIG. 6 processing commences at 600 and shows the steps taken by a process performed by an intelligent IT Ticket System. At step 610, the system processes input ticket data from data store 410 that is received by various sources into ticket vectors. Ticket vectors are shown stored in memory areas 445 (for unsupervised model) or 545 (for supervised model).

At step 620, the process obtains node topology from an input source, such as data store 410. The obtained node topology (e.g., nodes and their relationships with one another, etc.) are stored in memory area 625. See FIG. 8, and corresponding text, for further information regarding node topology processing. At step 630, the process generates node vectors with embedding of each node in network topology diagram based on graph embedding method and time series information. The node topology data is retrieved from memory area 625 and the generated node vectors are generated. Node vectors are shown stored in memory areas 450 (for unsupervised model) or 550 (for supervised model).

At step 640, the process gathers ticket side information (e.g., comments and work notes, server locations, geo locations, customers, etc.). The ticket data is retrieved from data store 410 and the gathered side ticket information is stored in memory area 650. At step 660, the process cleans and parses the side information (e.g., comments and work notes, etc.) stored in memory area 650. At step 670, the system processes the resulting (cleaned and parsed) side information into side information vectors. Side information vectors are shown stored in memory areas 455 (for unsupervised model) or 555 (for supervised model).

At step 675, the process merges vectors (ticket vector (445 or 545), node vector (450 or 550), and side information vector (455 or 555)) for hidden layer that is used in the neural network. At step 680, the process trains IT ticket model 105 of AI system 100 using resulting merged (weighted) vector. At step 690, downstream NLP tasks are able to resolve IT Tickets using the trained AI model, as depicted by NLP Tasks 685 and unresolved IT tickets 410. FIG. 6 processing thereafter ends at 695.

Figure 7:
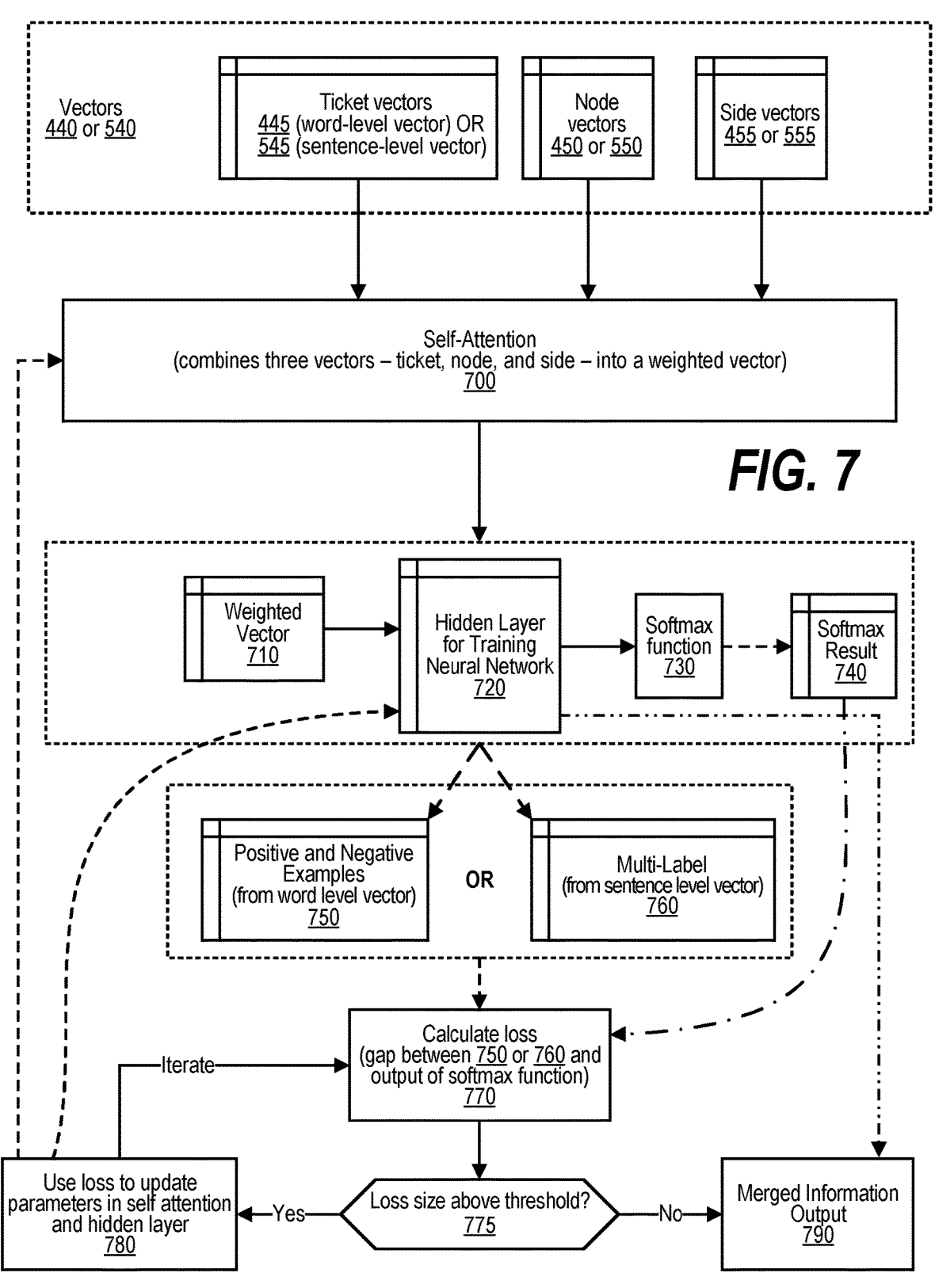
FIG. 7 is a depiction of a flowchart showing the logic used to process both types of models to train a neural network.

FIG. 7 is a depiction of a flowchart showing the logic used to process both types of models to train a neural network. Self-attention process 700 is performed to combine three vectors (ticket vector (445 or 545 depending on whether supervised or unsupervised model used), node vector (450 or 550 depending on whether supervised or unsupervised model used), and side information vector (455 or 555 depending on whether supervised or unsupervised model used)) into weighted vector 710.

Weighted vector 710 used for hidden layer for training the neural network 720. Output layer (Softmax function 730) generates softmax result 740. When the unsupervised model (shown in FIG. 4) is used, positive and negative examples 750 (from the word-level vector) result. On the other hand, when the supervised model (shown in FIG. 5) is used, multi-label 760 (from sentence level vector) results.

At step 770, the process calculates the loss (gap or difference between 750 or 760 and the output of softmax function). The process determines whether the loss size is above a given threshold (decision 775). If the loss size is above the threshold, then decision 775 branches to the 'yes' branch whereupon, at step 780, the process uses the loss data to update parameters in the self-attention process and in the hidden layer and iterates the process. This iteration is repeated until the loss size is below the threshold, at which point decision branches to the 'no' branch where merged information output 790 from hidden layer of the neural network is retrieved.

Figure 8:
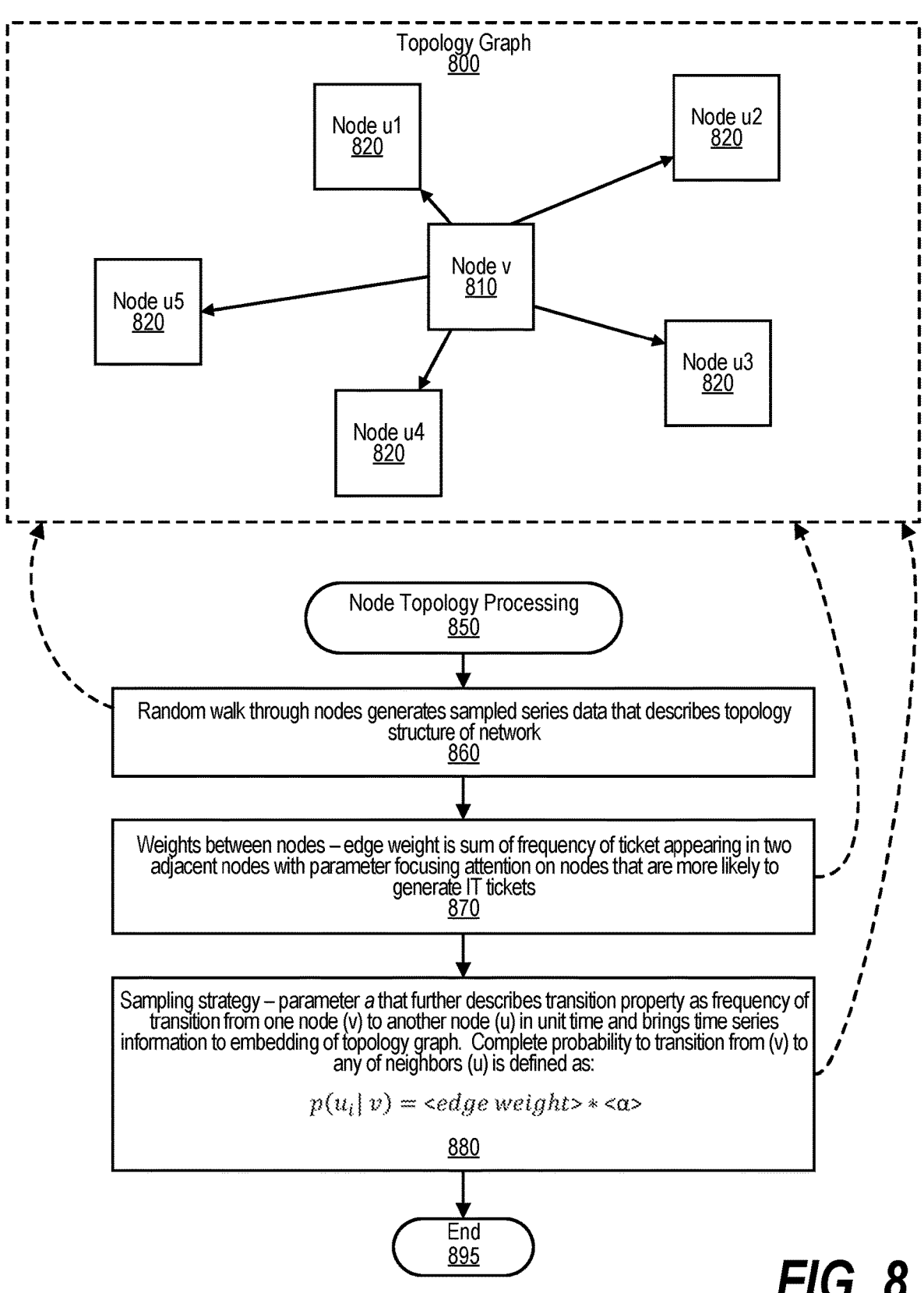
FIG. 8 is a depiction of a flowchart showing the logic used during node topology processing.

FIG. 8 is a depiction of a flowchart showing the logic used during node topology processing. Node topology graph 800 depicts a set of nodes showing the relationship of one node (node v 810) with respect to other nodes 820 (nodes u1, u2, u3, u4, and u5).

FIG. 8 processing commences at 850 and shows the Node Topology Processing steps. At step 860, the process randomly walks through the nodes and generates sampled series data that describes the topology structure of the network.

At step 870, the process calculates weights between the nodes. The edge weight is the sum of frequency of ticket appearing in two adjacent nodes with parameter focusing attention on nodes that are more likely to generate IT tickets.

At step 880, the process uses a sampling strategy where parameter 'a' that further describes transition property as frequency of transition from one node (v) to another node (u) in unit time and brings time series information to embedding of topology graph. Complete probability to transition from (v) to any of neighbors (u) is defined using the formula shown in block 880. FIG. 8 processing thereafter ends at 895.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method, implemented by an information handling system that includes a processor and a memory, the method comprising:
   receiving a plurality of information technology (IT) tickets from one or more ticket sources;
   calculating a topology graph comprising an edge weight of nodes, wherein the calculating comprises randomly discovering a relationship among connected nodes, and generating sampled series data describing a topology structure of a network, and wherein the edge weight is a sum of frequency of a ticket appearing in two adjacent nodes, based on one or more input parameters;
   pre-processing the plurality of IT tickets using Doc2Vec to embed descriptive information of the IT tickets to generate a word-level vector;
   using self-attention learning, merging the word-level vectors, outputting a weighted vector as a hidden input layer to train a neural network, until a loss gap between a softmax function and the hidden input layer is below a defined threshold; and
   based on the loss gap between the softmax function and the hidden input layer being below the defined threshold, providing by a trained model, responses to one or more requestors of an artificial intelligence (AI) system using the trained IT ticket model.

2. The method of claim 1, wherein each of the ticket vectors includes the ticket vector and a side information vector, the method further comprising: gathering a set of side information corresponding to each of the IT tickets; and processing the gathered side information into the side information vector.

3. The method of claim 2 wherein the side information includes at least one data item selected from the group consisting of a ticket comment, a ticket work note, a server location, a geographic location, and a customer identifier.

4. The method of claim 2 further comprising:
   selecting the ticket vector, the node vector, and the side information vector corresponding to a selected IT ticket; and
   merging the selected ticket vector, the selected node vector, and the selected side information vector, the merging resulting in a set of hidden layer data that is utilized to train a neural network in the AI system.

5. The method of claim 4 further comprising:
   performing a self-attention process on the selected ticket vector, the selected node vector, and the selected side information vector, the self-attention process resulting in a weighted vector utilized to train the neural network.

6. The method of claim 5 further comprising:
   calculating a difference between a result of a softmax function performed on the weighted vector and the set of hidden layer data; and
   repeatedly performing the self-attention process and the calculating until the difference is below a given threshold.

7. The method of claim 1 further comprising:
   generating the node vector by randomly traversing through a selected plurality of nodes from a set of sampled series data that describes a topology structure of a network;
   calculating a weight between the selected plurality of nodes; and
   utilizing a sampling strategy to describe a frequency of transitions between the selected plurality of nodes.

8. An information handling system comprising:
   one or more processors;
   a memory coupled to at least one of the processors;
   a set of computer program instructions stored in the memory and executed by at least one of the processors in order to perform actions comprising:
      receiving a plurality of information technology (IT) tickets from one or more ticket sources;
      calculating a topology graph comprising an edge weight of nodes, wherein the calculating comprises randomly discovering a relationship among connected nodes, and generating sampled series data describing a topology structure of a network, and wherein the edge weight is a sum of frequency of a ticket appearing in two adjacent nodes, based on one or more input parameters;

pre-processing the plurality of IT tickets using Doc2Vec to embed descriptive information of the IT tickets to generate a word-level vector;

using self-attention learning, merging the word-level vectors, outputting a weighted vector as a hidden input layer to train a neural network, until a loss gap between a softmax function and the hidden input layer is below a defined threshold; and based on the loss gap between the softmax function and the hidden input layer being below the defined threshold, providing by a trained model, responses to one or more requestors of an artificial intelligence (AI) system using the trained IT ticket model.

9. The information handling system of claim 8, wherein each of the ticket vectors includes the ticket vector and a side information vector, wherein the actions further comprise:

gathering a set of side information corresponding to each of the IT tickets; and processing the gathered side information into the side information vector.

10. The information handling system of claim 9 wherein the side information includes at least one data item selected from the group consisting of a ticket comment, a ticket work note, a server location, a geographic location, and a customer identifier.

11. The information handling system of claim 9 wherein the actions further comprise:

selecting the ticket vector, the node vector, and the side information vector corresponding to a selected IT ticket; and merging the selected ticket vector, the selected node vector, and the selected side information vector, the merging resulting in a set of hidden layer data that is utilized to train a neural network in the AI system.

12. The information handling system of claim 11 wherein the actions further comprise:

performing a self-attention process on the selected ticket vector, the selected node vector, and the selected side information vector, the self-attention process resulting in a weighted vector utilized to train the neural network.

13. The information handling system of claim 12 wherein the actions further comprise:

calculating a difference between a result of a softmax function performed on the weighted vector and the set of hidden layer data; and repeatedly performing the self-attention process and the calculating until the difference is below a given threshold.

14. The information handling system of claim 8 wherein the actions further comprise:

generating the node vector by randomly traversing through a selected plurality of nodes from a set of sampled series data that describes a topology structure of a network;

calculating a weight between the selected plurality of nodes; and utilizing a sampling strategy to describe a frequency of transitions between the selected plurality of nodes.

15. A computer program product stored in a computer readable storage medium, comprising computer program code that, when executed by an information handling system, performs actions comprising:

receiving a plurality of information technology (IT) tickets from one or more ticket sources;

calculating a topology graph comprising an edge weight of nodes, wherein the calculating comprises randomly discovering a relationship among connected nodes, and generating sampled series data describing a topology structure of a network, and wherein the edge weight is a sum of frequency of a ticket appearing in two adjacent nodes, based on one or more input parameters;

pre-processing the plurality of IT tickets using Doc2Vec to embed descriptive information of the IT tickets to generate a word-level vector;

using self-attention learning, merging the word-level vectors, outputting a weighted vector as a hidden input layer to train a neural network, until a loss gap between a softmax function and the hidden input layer is below a defined threshold; and based on the loss gap between the softmax function and the hidden input layer being below the defined threshold, providing by a trained model, responses to one or more requestors of an artificial intelligence (AI) system using the trained IT ticket model.

16. The computer program product of claim 15, wherein each of the ticket vectors includes the ticket vector and a side information vector, wherein the actions further comprise:

gathering a set of side information corresponding to each of the IT tickets; and processing the gathered side information into the side information vector.

17. The computer program product of claim 16 wherein the side information includes at least one data item selected from the group consisting of a ticket comment, a ticket work note, a server location, a geographic location, and a customer identifier.

18. The computer program product of claim 16 wherein the actions further comprise:

selecting the ticket vector, the node vector, and the side information vector corresponding to a selected IT ticket; and merging the selected ticket vector, the selected node vector, and the selected side information vector, the merging resulting in a set of hidden layer data that is utilized to train a neural network in the AI system.

19. The computer program product of claim 18 wherein the actions further comprise:

performing a self-attention process on the selected ticket vector, the selected node vector, and the selected side information vector, the self-attention process resulting in a weighted vector utilized to train the neural network.

20. The computer program product of claim 15 wherein the actions further comprise:

generating the node vector by randomly traversing through a selected plurality of nodes from a set of sampled series data that describes a topology structure of a network;

calculating a weight between the selected plurality of nodes; and utilizing a sampling strategy to describe a frequency of transitions between the selected plurality of nodes.

* * * * *